United States Patent
Lopez et al.

(10) Patent No.: US 10,277,565 B2
(45) Date of Patent: Apr. 30, 2019

(54) ENTERPRISE SERVICE BUS LOGGING

(71) Applicant: HEWLETT PACKARD ENTERPRISE DEVELOPMENT LP, Houston, TX (US)

(72) Inventors: Scott Lopez, Plano, TX (US); Jeff Kalibjian, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 79 days.

(21) Appl. No.: 15/500,923

(22) PCT Filed: Dec. 31, 2014

(86) PCT No.: PCT/US2014/073036
§ 371 (c)(1),
(2) Date: Jan. 31, 2017

(87) PCT Pub. No.: WO2016/108902
PCT Pub. Date: Jul. 7, 2016

(65) Prior Publication Data
US 2017/0230347 A1 Aug. 10, 2017

(51) Int. Cl.
H04L 29/06 (2006.01)
G06F 17/40 (2006.01)
G06F 21/60 (2013.01)
G06F 21/62 (2013.01)

(52) U.S. Cl.
CPC ............ *H04L 63/061* (2013.01); *G06F 17/40* (2013.01); *G06F 21/602* (2013.01); *G06F 21/6227* (2013.01); *H04L 63/0435* (2013.01); *H04L 63/0442* (2013.01)

(58) Field of Classification Search
None
See application file for complete search history.

(56) References Cited

U.S. PATENT DOCUMENTS

| 8,046,195 B2 | 10/2011 | Vecera et al. |
| 8,090,660 B2 | 1/2012 | Solomon et al. |
| 8,112,434 B2 | 2/2012 | Patten et al. |
| 8,156,140 B2 | 4/2012 | Roshen et al. |

(Continued)

FOREIGN PATENT DOCUMENTS

WO 2008/121744 A2 10/2008

OTHER PUBLICATIONS

The Open Group, "SOA Reference Architecture Technical Standard: Integration Layer," 8 p.

(Continued)

*Primary Examiner* — Lynn D Feild
*Assistant Examiner* — Richard A McCoy
(74) *Attorney, Agent, or Firm* — Hewlett Packard Enterprise Patent Department

(57) ABSTRACT

Logging of enterprise service bus (ESB) activity includes receiving, from the ESB, information specific to an inter-application message. Control data, provided by an application communicating via the ESB that specifies how the information is to be encrypted for logging and what portions of the information is to be logged is extracted from the information. The information is encrypted in accordance with the control data, and the encrypted information is recorded.

13 Claims, 6 Drawing Sheets

(56) References Cited

U.S. PATENT DOCUMENTS

| | | | |
|---|---|---|---|
| 8,185,916 | B2 | 5/2012 | Toussaint et al. |
| 8,200,278 | B2 | 6/2012 | Little |
| 8,265,275 | B2 | 9/2012 | Lotspiech |
| 8,321,909 | B2 | 11/2012 | Fot et al. |
| 8,364,745 | B2 | 1/2013 | Roshen |
| 8,379,847 | B2* | 2/2013 | Bell, Jr. .............. H04L 9/06 380/44 |
| 8,433,746 | B2 | 4/2013 | Vecera et al. |
| 8,458,793 | B2 | 6/2013 | McKenna |
| 8,489,733 | B2 | 7/2013 | Vecera et al. |
| 8,561,175 | B2 | 10/2013 | Williams et al. |
| 8,570,905 | B2 | 10/2013 | Hulse et al. |
| 8,613,043 | B2 | 12/2013 | Fot et al. |
| 8,655,941 | B2 | 2/2014 | Roshen |
| 8,707,427 | B2 | 4/2014 | Hooks et al. |
| 8,775,651 | B2 | 7/2014 | Brown et al. |
| 9,239,841 | B2* | 1/2016 | Arnaudov ......... G06F 17/30097 |
| 9,697,061 | B1* | 7/2017 | Lazier ................... G06F 9/547 |
| 2006/0101517 | A1 | 5/2006 | Banzhof et al. |
| 2008/0140759 | A1 | 6/2008 | Conner et al. |
| 2009/0006167 | A1 | 1/2009 | Toussaint et al. |
| 2009/0064271 | A1 | 3/2009 | Ng et al. |
| 2010/0100965 | A1 | 4/2010 | O'Brien et al. |
| 2011/0125527 | A1 | 5/2011 | Nair |
| 2011/0302412 | A1 | 12/2011 | Deng et al. |
| 2012/0174185 | A1 | 7/2012 | Milman et al. |
| 2012/0185725 | A1 | 7/2012 | Peters et al. |
| 2013/0086689 | A1 | 4/2013 | Laverdiere-Papineau |
| 2013/0104236 | A1 | 4/2013 | Ray et al. |
| 2013/0318536 | A1 | 11/2013 | Fletcher et al. |
| 2013/0332660 | A1* | 12/2013 | Talagala ............. G06F 12/0246 711/103 |
| 2014/0068630 | A1* | 3/2014 | Fildebrandt ............. G06F 9/546 719/313 |
| 2014/0089264 | A1* | 3/2014 | Talagala .............. G06F 11/1471 707/649 |
| 2014/0164776 | A1 | 6/2014 | Hook et al. |
| 2014/0189340 | A1 | 7/2014 | Hadley |
| 2014/0344569 | A1* | 11/2014 | Li ......................... G06F 21/128 713/164 |
| 2015/0381578 | A1* | 12/2015 | Thota ....................... G09C 1/00 713/168 |
| 2016/0072886 | A1* | 3/2016 | Lin .................... H04L 67/1097 709/213 |

OTHER PUBLICATIONS

Reserve Bank of India, "Working Group Report on Cloud Computing Option for Urban Cooperative Banks," Oct. 5, 2012, pp. 1-18, Available at <rbi.org.in/scripts/PublicationReportDetails.aspx?ID=679>.

Lisa Phifer, "Managing WLAN Risks with Vulnerability Assessment," Technology Whitepaper, 2011, pp. 1-23, AirMagnet, Inc.

International Search Report and Written Opinion received for PCT Patent Application No. PCT/US2014/073036, dated Jul. 7, 2015, 7 pages.

International Search Report and Written Opinion received for PCT Patent Application No. PCT/US2014/063314, dated Jul. 31, 2015, 12 pages.

International Preliminary Report on Patentability received for PCT Patent Application No. PCT/US2014/073036, dated Jul. 13, 2017, 6 pages.

International Preliminary Report on Patentability received for PCT Patent Application No. PCT/US2014/063314, dated May 11, 2017, 11 pages.

Dan Schutzer et al., "Big Data and Security," The Innovator, Jan. 2013, pp. 1-23, vol. 54, Issue 1, BITS Financial Services Roundtable.

* cited by examiner

ENTERPRISE SERVICE BUS LOGGING

BACKGROUND

An enterprise service bus (ESB) is a system that provides communications, message routing, and message transformation to enterprise applications. For example, an application (requestor) may request data from another application (provider) in the enterprise. The ESB receives the message from the requester, transforms the message to a protocol and format understood by the provider application, and then forwards the transformed message to the provider application for processing. In response, the provider application performs desired operations and can send a message or resultant data to the requesting application. In this manner, the ESB provides communications between otherwise incompatible applications.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

An enterprise service bus (ESB) can provide important communication and services that allow disparate applications to interact in a services oriented architecture (SOA). However, conventional ESB implementations fail to provide a record detailing operations performed by the ESB, or to provide construction of such a record in accordance with the privacy requirements of each application communicating via the ESB. The ESB logging system disclosed herein records operations performed by and data transferred via the ESB and allows communicating applications to control what data is logged and what security is applied to logged data. Thus, the ESB logging system disclosed herein can provide a record of ESB activities while providing client applications the ability to control and manage transaction information that is retained by the ESB.

Figure 1:
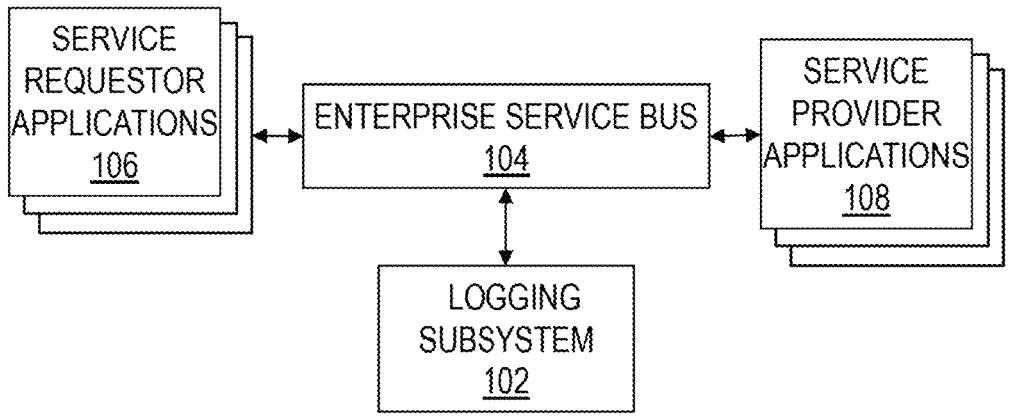
FIGS. 1 and 2 show block diagrams of a system that includes enterprise service bus (ESB) logging in accordance with various examples.
Figure 2:
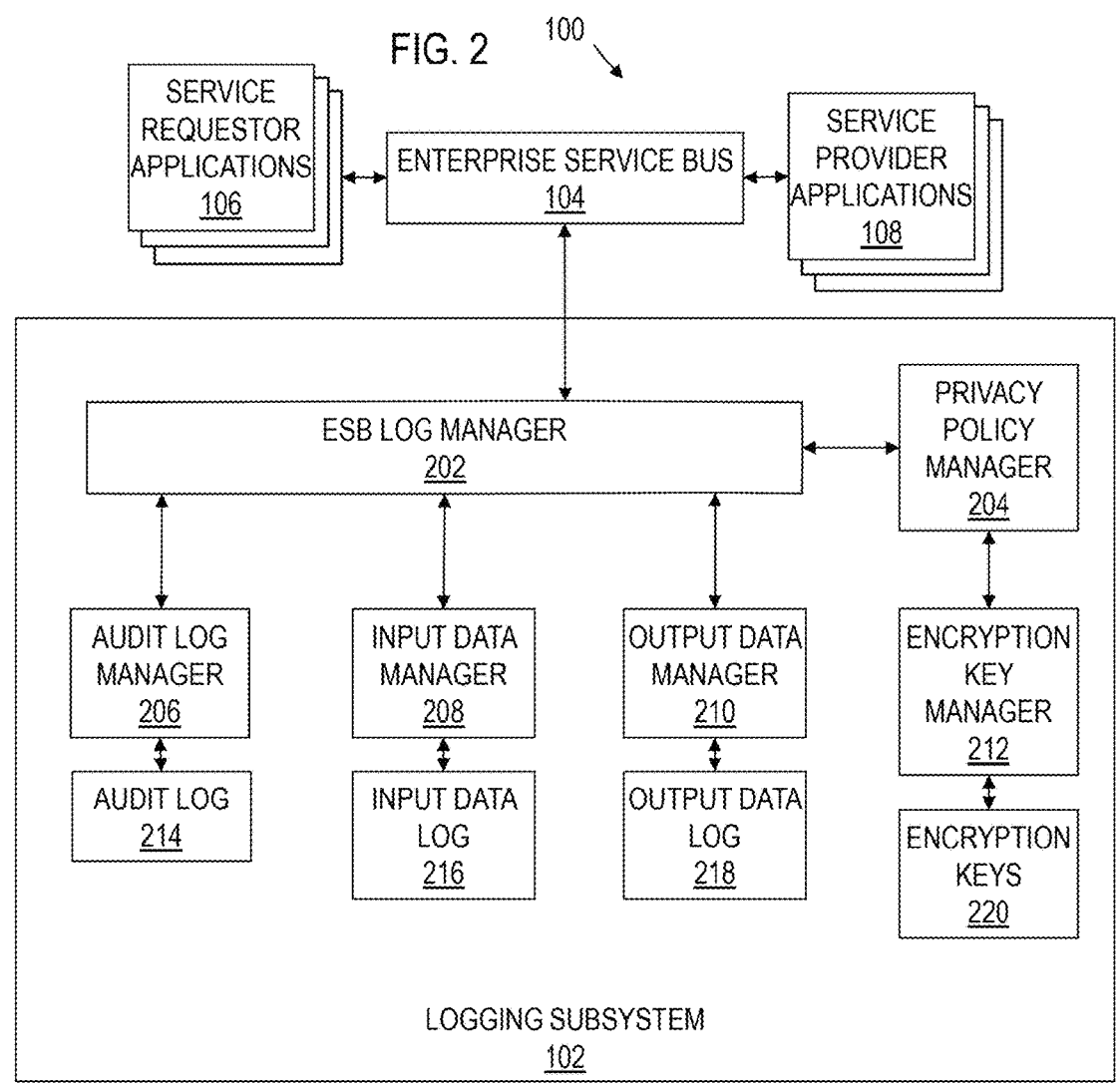

FIGS. 1 and 2 show block diagrams of a system 100 that includes enterprise service bus (ESB) logging in accordance with various examples. The system 100 includes an ESB 104, an ESB logging subsystem 102, and applications 106, 108 that communicate and receive services via the ESB. The service requestor applications 106 communicate via the ESB 104 to request services from the service provider applications 108, which communicate via the ESB 104 to provide services to the requestor applications 106. Any application communicating via the ESB 104 may serve as a requestor application and/or a provider application 108.

The ESB logging subsystem 102 communicates with and provides logging services to the ESB 104. The ESB 104 receives service requests from the service requestor applications 106, and for each service request, the ESB 104 collects service call information, requestor application 106 log privacy preference information, requestor application preferences regarding what information is to be logged, requestor application input data, ESB output information, and other request related information to be logged. The ESB 104 transfers the collected information to the ESB logging subsystem 102. The information transferred to the ESB logging subsystem 102 by the ESB 104 includes parameters specifying what portion of the information is to be logged and how the information is to be protected (via encryption). The parameters can be provided to the ESB 104 by the applications 106, 108. Thus each application 106, 108 can control what information provided and/or received by the application is logged and how the information is protected (via encryption) for storage. If the requestor application has no preference for what information is logged and how logged information is protected, then default ESB policy settings may be applied. In some implementations, the ESB 104 arranges audit information provided to the ESB logging subsystem 102 for storage in the audit logs 214 as:

| | |
|---|---|
| Time | Time service request received |
| Date | Date service request received |
| Requestor ID | Requesting process identity |
| Requested Function | Requested ESB function to perform on the input data |
| Input format | Format of the input data client is submitting |
| Output format | Desired output format of the data the ESB is generating after performing desired function on input data |
| Hash of Input Data | SHA hash of input data to ESB function selected |
| Size of Input Data | Size of input data |
| Hash of Output Data | SHA hash of output data generated by the ESB function |
| Size of Output Data | Size of the output data generated |
| Location of Input Data | Optional location of copy of input data (if client has requested/allowed back-up copy to be maintained |
| Location of Output Data | Optional location of copy of output data (if client has requested/allowed back-up copy to be maintained |
| Privacy Mode Audit Log | Encryption mode to apply for audit log (this example implementation) |
| Privacy Mode Input Data | Encryption mode to apply to input data |
| Privacy Mode Output Data | Encryption model to apply to output data |

The ESB 102 may construct input and/or output data records containing data to be stored in the input data log 216 or the output data log 218 that include similar fields and structure.

The ESB logging subsystem 102 includes ESB log manager 202, privacy policy manager 204, encryption key manager 212, audit log manager 206, input data manager 208, and output data manager 210. The ESB logging subsystem 102 also includes audit log 214, input data log 216, output data log 218, and encryption keys 220, that are managed by the encryption key manager 212. Each of the audit log 214, input data log 216, and output data log 218 may be a flat file in a storage device or entries in a database (e.g., a relational or object-oriented database). The audit log 214 stores information related to events and operations in the ESB 104 performed in response to a service request received by the ESB 104 from an application 106, 108. The input data log 216 stores information received from an application 106, 108 for transfer to a different application. The output data log 218 stores output data generated by the ESB 104 or another application (e.g., service provider application 108).

The ESB log manager 202 communicates with the ESB 104 and controls routing of information received from the ESB 104 to the audit log manager 206, input data manager 208, and output data manager 210 for storage in the audit log 214, input data log 216, and output data log 218. The ESB log manager 202 parses the information received from the ESB 104 and extracts, from the information, control data that specifies how information to be logged is to be protected (via encryption), and specifies what portion of the information received from the ESB 104 is to be logged. The control data may be provided to the ESB 104 by the application that generated the request triggering the ESB 104 to collect and pass information to the logging subsystem 102.

The ESB log manager 202 passes the log encryption control data extracted from the information received from the ESB 104 to the privacy policy manager 204. The privacy policy manager 204 examines the log encryption control data and interacts with the encryption key manager 212 to retrieve encryption keys 220 under management that are to be applied to encrypt the information for storage in the logs 214, 216, 218. The ESB log manager 202 passes the information to be logged and the encryption keys provided by the privacy policy manager 204 to the log manager(s) 206, 208, 210 for the appropriate log(s) 214, 216, 218. The log managers 206, 208, 210 encrypt the information to be logged using the encryption keys (e.g., symmetric encryption keys) provided and managed by the encryption key manager (212) in accordance with a privacy mode specified for the information.

The encryption control data may specify a different privacy mode for each of audit data, input data, and output data, where the privacy mode defines the cryptographic protection to be applied to the data. Privacy modes supported by the privacy manager 202 and the log managers 206, 208, 210 include ESB Record Privacy Discretion, ESB Record Privacy General, ESB Record Privacy New, and ESB Record Privacy with Requestor Discretion.

The ESB Record Privacy Discretion mode specifies that the service requestor application 106 has no preference as to whether the information to be logged is to be encrypted. This implies that if the ESB audit log policy in place specifies that the information logged is to be protected, the privacy policy manager 204 provides a general use symmetric encryption key that will be used for a designated period of time specific to the log in which the information (i.e., audit log 214, input data log 216, or output data log 218) is to be stored.

The ESB Record Privacy General mode specifies that the service requestor application 106 requests that the information to be logged be encrypted, but does not desire cryptographic key management control. The information is encrypted using an ESB symmetric encryption key specific to the log in which the information (i.e., audit log 214, input data log 216, or output data log 218) is to be stored.

The ESB Record Privacy New mode specifies that the service requestor application 106 requests that the information to be logged be encrypted, but does not desire cryptographic key management control; however, the service requestor application 106 does require that a new symmetric encryption key be generated by the privacy policy manager 204, and the information is encrypted using the newly generated symmetric encryption key.

The ESB Record Privacy with Requestor Discretion mode specifies that the service requestor application 106 desires audit log privacy, with partial key management control. The ESB symmetric encryption key for the log in which the information is to be stored will first be encrypted with the ESB's digital identity public key, and then encrypted with the digital identity public key of the service requestor application 106. Thus, any disclosure of logged information for a particular service requestor application 106 will require the service requestor application 106 to decrypt the twice public key encrypted, symmetric encryption key blob with the private key of the service requestor application 106, before the log manager (206, 208, or 210) of the relevant log (214, 216, or 218) can decrypt the key blob with the private key of the specific log. In the ESB Record Privacy with Requestor Discretion mode a new symmetric encryption key may be generated on each new service call by the same application.

The encryption control data provided to the ESB logging subsystem 102 with information to be logged may specify a different one of the privacy modes described above for each of audit log data, input data, and output data. The privacy policy manager 204 and encryption key manager 212 provide encryption keys for use in accordance with each of the specified privacy modes.

In accordance with the privacy modes described above, the encryption keys 220 may include, for each of the logs 214, 216, and 218:
  general symmetric encryption keys for encrypting records where the client has expressed no preference for file privacy;
  specific application symmetric encryption keys for use if the application specifies privacy, but no control of the symmetric bulk cryptographic keys; and
  dual asymmetric encryption keys for use if the application specifies privacy and partial control of the symmetric cryptographic keys discussed in the prior two bullets.

The general and specific symmetric encryption keys for each log may change according to a predetermined key change schedule. That is, after a specified period of use, a new key will be generated to use for the next incremental time period. Dual controlled encryption may require single use symmetric keys, or keys used over a span of time, depending on the preference of the application. In either case the symmetric key may be wrapped with both the ESB digital identity public key and the application requestor digital identity public key.

Figure 3:
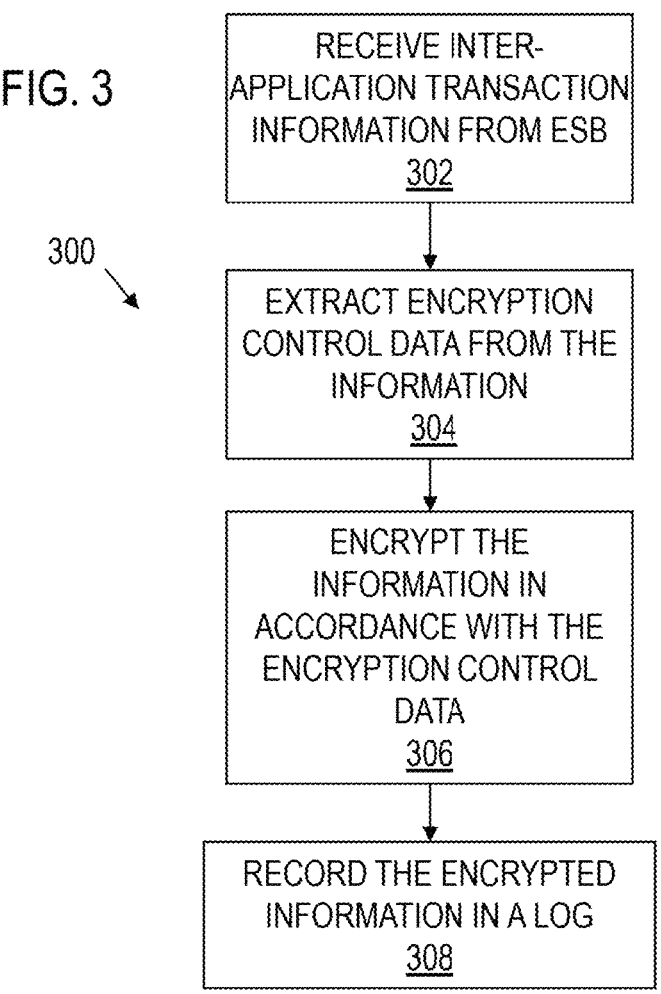
FIGS. 3 and 4 show flow diagrams for methods for logging ESB activity in accordance with various examples.
Figure 4:
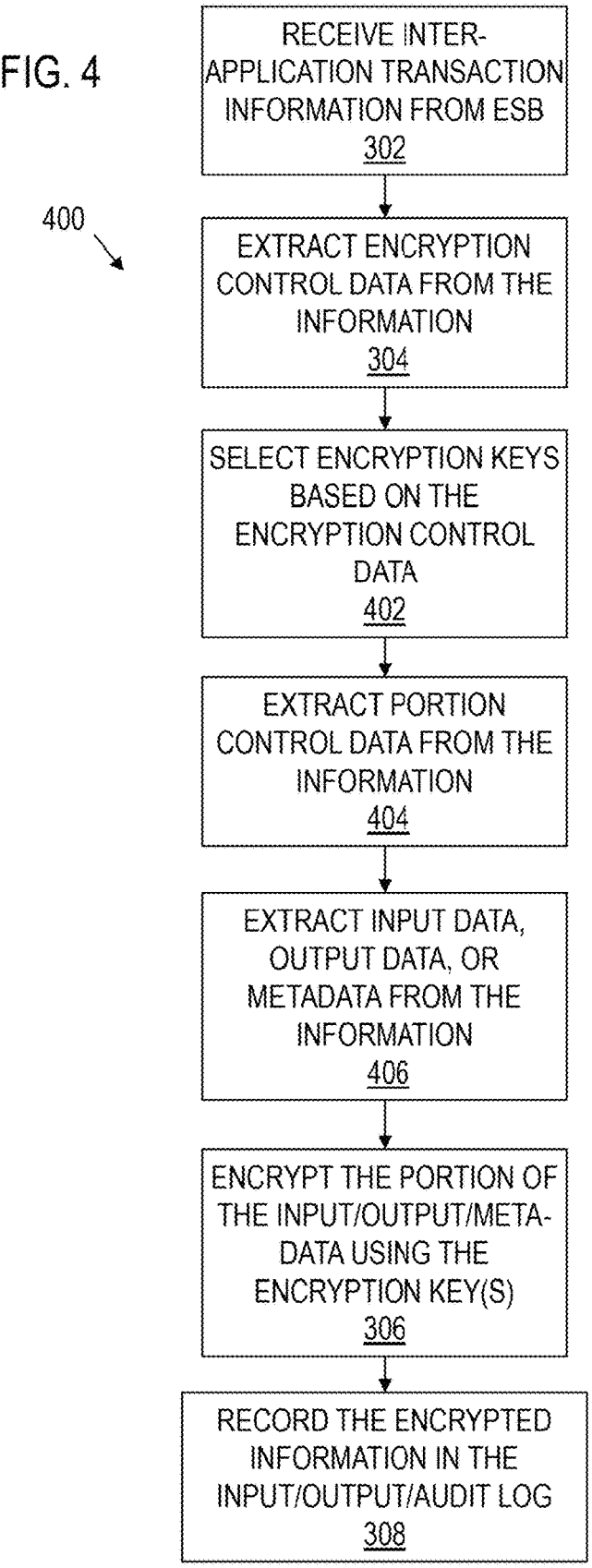

FIGS. 3 and 4 show flow diagrams for methods 300, 400 for logging ESB activity in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the methods 300 and 400 can be implemented as instructions stored in a storage device and executed by one or more processors.

In block 302, the ESB 104 is transferring messages between the service requestor applications 106 and the service provider applications 108. On receipt of a service request directed to a service provider application 108 by a service requestor application 106, the ESB 104 collects information related to the service request and passes the information to the ESB logging subsystem 102. The ESB logging subsystem 102 receives the inter-application transaction information from the ESB 104.

In block 304, the ESB log manager 202 of the ESB logging subsystem 102 parses the information received from the ESB 102 and extracts log encryption control data from the information. The log encryption control data specifies a privacy mode to apply to each type of data to be logged. For example, the encryption control data may specify a first privacy mode to apply to transaction metadata to be stored in the audit log 214, a second privacy mode to apply to ESB input data to be stored in the input data log 216, and a third privacy mode to apply to ESB output data to be stored in the output data log 218. Each application 106, 108 may specify the privacy mode to be applied to each type of data logged on a request by the application.

In block 402, the ESB log manager 202 passes the log encryption control data to the privacy policy manager 204. The privacy policy manager 204 communicates with the encryption key manager 212 to retrieve the encryption keys 220 needed to implement the privacy modes specified by the log encryption control data. The privacy policy manager 204 passes the encryption keys to the ESB log manager 202.

In block 404, the ESB log manager 202 extracts portion control data from the information received from the ESB 104. The portion control data specifies what portion of the information received from the ESB 104 is to be logged. Each application 106, 108 may specify the portion of each type of information (e.g., various portions of the request metadata, input data, output data) to be logged on a request by the application.

In block 406, the ESB log manager 202 extracts the information to be logged from the information received from the ESB 104. The information to be logged may include request metadata to be recorded in the audit log 214, request input data to be stored in the input data log 216, and/or ESB output data to be recorded in the output data log 218. The ESB log manager 202 may pass the portion, specified by the portion control data, of each type of information extracted from the information received from the ESB 104 to the appropriate log manager 206, 208, 210. The ESB log manager 202 also passes to each log manager 206, 208, 210 the encryption keys needed to implement the privacy mode requested for the particular log.

In block 306, each log manager 206, 208, 210 encrypts the information received from the ESB log manager 202 using the encryption keys received from the ESB log manager 202 to implement the privacy mode requested for the log. For example, the audit log manager 206 encrypts the audit information received from the ESB log manager 202 to implement the audit log privacy mode specified by the application 106, 108, the input log manager 208 encrypts the input data received from the ESB log manager 202 to implement the input log privacy mode specified by the application 106, 108, and the output log manager 210 encrypts the output data received from the ESB log manager 202 to implement the output log privacy mode specified by the application 106, 108.

In block 308, each log manager 206, 208, 210 records the encrypted information in the associated log 214, 216, 218. For example, the audit log manager 206 records the encrypted audit information in the audit log 214, the input log manager 208 records the encrypted input data in the input log 216, and the output log manager 210 records the encrypted ESB output data in the output log 218.

Figure 5:
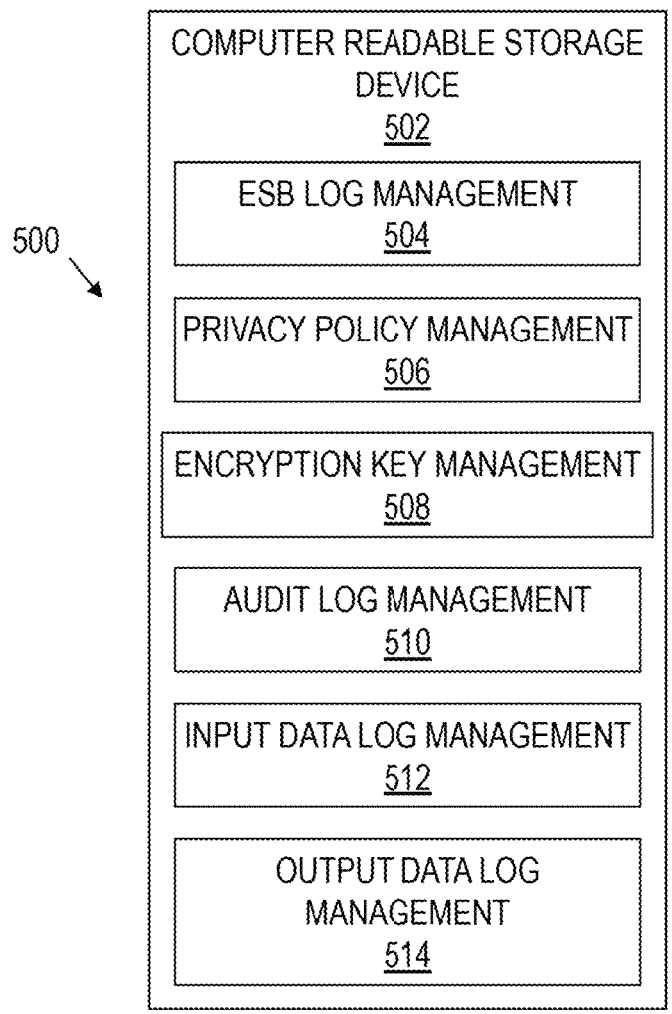
FIG. 5 shows a block diagram of a computer readable storage device encoded with ESB logging instructions in accordance with various examples.

FIG. 5 shows a block diagram of a computer readable storage device 502 encoded with ESB logging instructions in accordance with various examples. The computer readable storage device 502 is a non-transitory storage medium that includes any of volatile storage such as random access memory, non-volatile storage (e.g., a hard drive, an optical storage device (e.g., CD or DVD), FLASH storage, read-only-memory), or combinations thereof.

The storage device 502 includes ESB log management 504, privacy policy management 506, encryption key management 508, audit log management 510, input data log management 512, and output data log management 514. The ESB log management 504 includes instructions that are executable by a processor in the ESB logging subsystem 102 to communicate with the ESB 104 and perform other ESB log management operations disclosed herein.

The privacy policy management 506 includes instructions that are executable by a processor in the ESB logging subsystem 102 to provide encryption keys needed to implement each specified privacy mode, and perform other privacy policy management operations disclosed herein.

The encryption key management 508 includes instructions that are executable by a processor in the ESB logging subsystem 102 to manage the encryption keys 220 needed to implement each specified privacy mode, and perform other encryption key management operations disclosed herein.

The audit log management 510 includes instructions that are executable by a processor in the ESB logging subsystem 102 to manage access to the audit log 214, encrypt data to be written to the audit log 214, and perform other audit log management operations disclosed herein.

The input data log management 512 includes instructions that are executable by a processor in the ESB logging subsystem 102 to manage access to the input data log 216, encrypt data to be written to the input data log 216, and perform other input data log management operations disclosed herein.

The output data log management 514 includes instructions that are executable by a processor in the ESB logging subsystem 102 to manage access to the output data log 218, encrypt data to be written to the output data log 218, and perform other output data log management operations disclosed herein.

Figure 6:
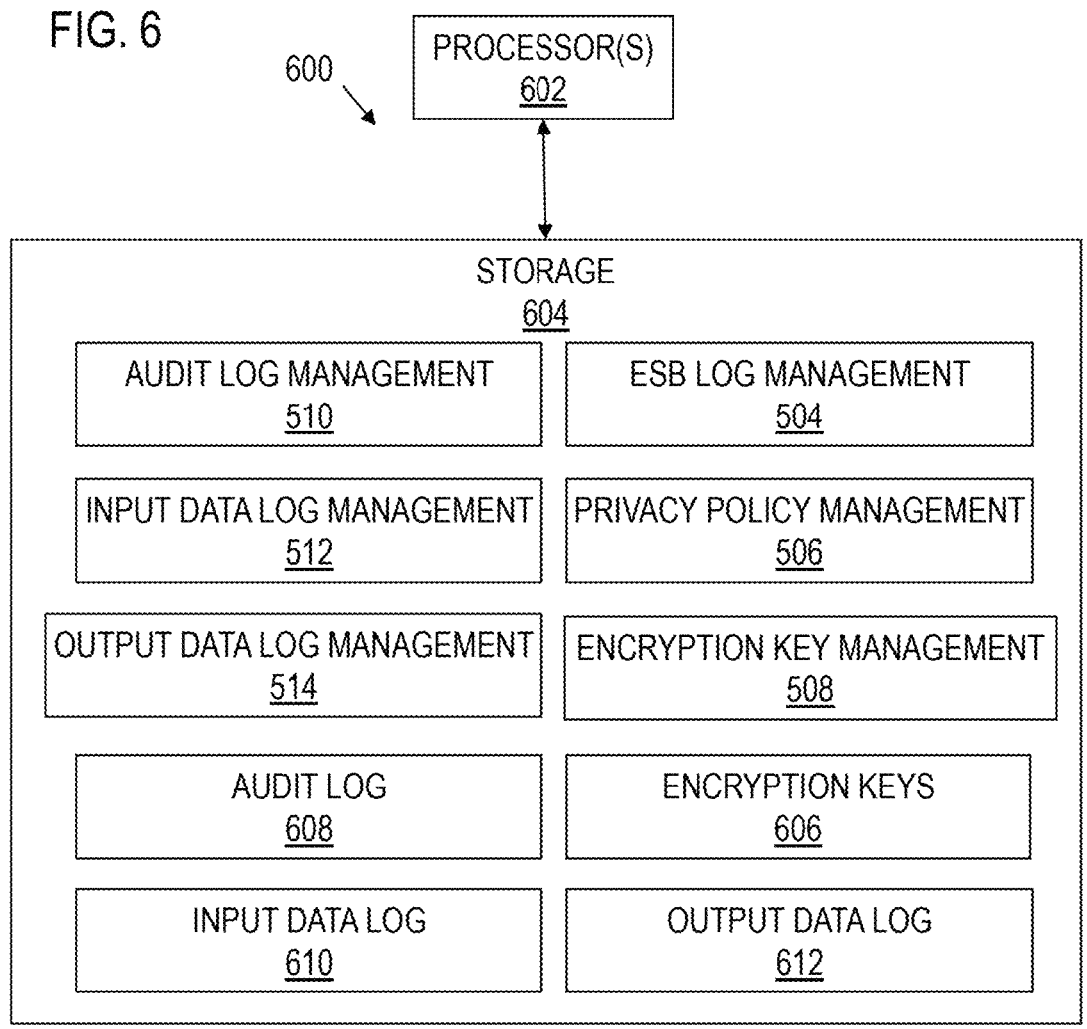
FIG. 6 shows a block diagram of a computer that provides ESB logging in accordance with various examples.

FIG. 6 shows a block diagram of a computer 600 that provides ESB logging in accordance with various examples. The computer 600 may include various components and systems that have been omitted from FIG. 6 in the interest of clarity. For example, the computer 600 may include network adapters, display systems, user interfaces, etc. In some implementations, the computer 600 may include a plurality of communicatively coupled computers.

The computer 600 includes one or more processors 602 and storage 604 coupled to the processors 602. The storage 604 may be the computer-readable storage device 502. The processor 602 is a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and subsystems.

The storage 604 includes ESB log management 504, privacy policy management 506, encryption key management 508, audit log management 510, input data log management 512, and output data log management 514 as described with respect to the computer readable storage device 502. The processor(s) 602 execute the instructions of the ESB log management 504, privacy policy management 506, encryption key management 508, audit log management 510, input data log management 512, and output data log management 514 to perform the operations disclosed herein as respectively performed by the ESB log manager 202, the privacy policy manager 204, the encryption key manager 212, the audit log manager 206, the input data manager 208, and the output data manager 210.

Accordingly, the ESB log manager 202 includes one or more processors 602 and instructions of the ESB log management 504. The privacy policy manager 204 includes one or more processors 602 and instructions of the privacy policy management 506. The encryption key manager 212 includes one or more processors 602 and instructions of the encryption key management 508. The audit log manager 206 includes one or more processors 602 and instructions of the audit log management 510. The input data manager 208 includes one or more processors 602 and instructions of the input data log management 512. The output data manager 210 includes one or more processors 602 and instructions of the output data log management 514.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a logging subsystem to:
communicate with an enterprise service bus (ESB) that provides communication between applications;
receive, from the ESB, information specific to an inter-application message;
extract, from the information, control data, provided by an application communicating via the ESB, that specifies how the information is to be encrypted for logging;
encrypt the information in accordance with the control data; and
record the encrypted information
wherein the control data specifies what portion of the information is to be logged and what portion of the information that is to be logged is to be encrypted, and the logging subsystem is to record only the specified portion of the information.

2. The system of claim 1, wherein the information comprises input data provided by the application for transfer to a different application, and the control data specifies encryption to be applied to the input data; and the logging subsystem comprises an input data manager to:
encrypt the input data in accordance with the control data; and
record the encrypted input data in an input data log.

3. The system of claim 1, wherein the information comprises output data generated by the ESB responsive to input data provided by the application, and the control data specifies encryption to be applied to the ESB output data; and the logging subsystem comprises an output data manager to:
encrypt the ESB output data in accordance with the control data; and
record the encrypted ESB output data in an output data log.

4. The system of claim 1, wherein the information comprises metadata generated by the ESB responsive to the message, and the control data specifies encryption to be applied to the metadata; and the logging subsystem comprises an audit log manager to:
encrypt the metadata in accordance with the control data; and
record the encrypted metadata in an audit log.

5. The system of claim 1, wherein the logging subsystem comprises:
a privacy policy manager to provide cryptographic keys to the logging controller, the cryptographic keys selected based on the control data, and wherein the privacy policy manager is to:
based on the control data indicating that the application communicating with the ESB requests encryption using an existing symmetric cryptographic key, use the existing symmetric cryptographic key that is specific to the application for encryption of the information;
based on the control data indicating that the application communicating with the ESB has no privacy preference, provide a symmetric cryptographic key that is specific to the application for encryption of the information, and wherein provision of the symmetric cryptographic key is further based on specification of log encryption by an ESB log protection policy;
based on the control data indicating that the application communicating with the ESB requests encryption using a new symmetric cryptographic key, generate a new symmetric cryptographic key that is specific to the application for encryption of the information;
based on the control data indicating that the application communicating with the ESB requests partial key management control, provide a symmetric cryptographic key associated with the ESB for initial encryption of the information, and provide both an ESB digital identity public key and an application digital identity public key to wrap the symmetric key.

6. A method, comprising:
receiving, by a logging system, comprising a processor, that communicates with an enterprise service bus (ESB) that provides communication between applications, information specific to an inter-application transaction;
extracting, by the logging system, from the information, control data, provided by an application communicating via the ESB, that specifies how, and what portion of, the information is to be encrypted for logging;
encrypting the information in accordance with the control data;
selecting, based on the information, a log from a plurality of different logs maintained by the logging system;
recording the encrypted information in the selected log;
extracting from the control data, a parameter specifying what portion of the information is to be logged; and
recording only the specified portion of the information.

7. The method of claim 6, further comprising:
extracting, from the information, input data provided by the application for transfer to a different application;
extracting, from the control data, a parameter that specifies encryption to be applied to the input data;
encrypting the input data in accordance with the control data; and
recording the encrypted input data in an input data log.

8. The method of claim 6, further comprising:
extracting, from the information, output data generated by the ESB responsive to input data provided by the application;
extracting, from the control data, a parameter that specifies encryption to be applied to the ESB output data;
encrypting the ESB output data in accordance with the control data; and
recording the encrypted ESB output data in an output data log.

9. The method of claim 6, further comprising:
extracting, from the information, metadata generated by the ESB responsive to the transaction;
extracting, from the control data, a parameter that specifies encryption to be applied to the metadata;
encrypting the metadata in accordance with the control data; and
recording the encrypted metadata in an audit log.

10. The method of claim 6, further comprising:
providing a cryptographic key specified by the ESB for encryption of the information based on the control data indicating that the application communicating with the ESB requests encryption using an existing symmetric cryptographic key, use the existing symmetric cryptographic key that is specific to the application for encryption of the information;
providing a cryptographic key that is specific to the application for encryption of the information based on the control data indicating that the application communicating with the ESB has no privacy preference, and wherein providing the cryptographic key is further based on specification of log encryption by an ESB log protection policy;
generating a new cryptographic key that is specific to the application for encryption of the information based on the control data indicating that the application communicating with the ESB requests encryption using a new cryptographic key; and
providing a symmetric cryptographic key associated with the ESB for initial encryption of the information, and providing both an ESB digital identity public key and an application digital identity public key which will be both used to wrap the symmetric key based on the control data indicating that the application communicating with the ESB requests partial cryptographic key management control.

11. A non-transitory computer-readable medium encoded with instructions that when executed cause a processor to:
receive, from an enterprise service bus (ESB), information specific to an inter-application message transferred via the ESB;
extract, from the information, control data, provided by an application communicating via the ESB, that specifies:
what portion of the information is to logged; and
how the information is to be encrypted for logging;
encrypt the specified portion of the information in accordance with the control data; and
record the encrypted specified portion of the information in a log.

12. The computer-readable medium of claim 11 encoded with instructions that when executed cause a processor to:
determine whether the information comprises:
input data provided by the application for transfer to a different application, wherein the control data specifies encryption to be applied to the input data;
output data transferred via the ESB and generated responsive to input data provided by the application, wherein the control data specifies encryption to be applied to the output data; or
metadata generated by the ESB responsive to the message, wherein the control data specifies encryption to be applied to the metadata; and
based on the information comprising input data:
encrypt the input data in accordance with the control data; and
record the encrypted input data in an input data log;
based on the information comprising output data:
encrypt the output data in accordance with the control data; and
record the encrypted output data in an output data log;
based on the information comprising metadata:
encrypt the metadata data in accordance with the control data; and
record the encrypted metadata data in an audit data log.

13. The computer-readable medium of claim 11 encoded with instructions that when executed cause a processor to:
provide cryptographic keys, selected based on the control data, for use in encrypting the information; wherein the instructions cause the processor to
based on the control data indicating that the application communicating with the ESB has no privacy preference, provide a cryptographic key specified by the ESB for encryption of the information, wherein provision of the cryptographic key is further based on specification of log encryption by an ESB log protection policy;
based on the control data indicating that the application communicating with the ESB requests encryption using a new cryptographic key, generate a new cryptographic key that is specific to the application for encryption of the information;
based on the control data indicating that the application communicating with the ESB requests encryption using an existing cryptographic key, access the existing cryptographic key that is specific to the application for encryption of the information; and
based on the control data indicating that the application communicating with the ESB requests partial cryptographic key management control, provide a symmetric cryptographic key associated with the ESB for initial encryption of the information, and provide a public cryptographic key associated with the application for encryption of the symmetric key used to encrypt the information after the symmetric key is encrypted with an ESB audit system public key.

* * * * *